(No Model.)
D. C. KNIGHT.
Faucet.
No. 235,091. Patented Dec. 7, 1880.
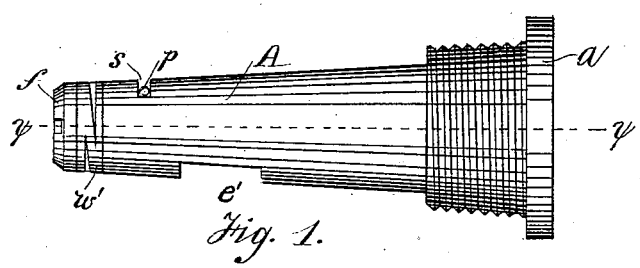 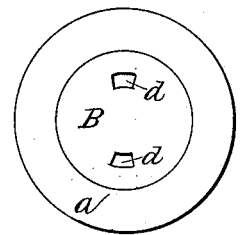
Fig. 1. Fig. 2.
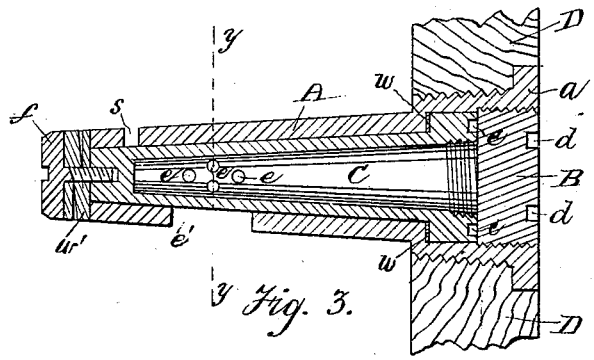 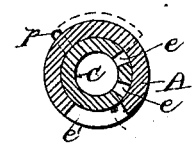
Fig. 3. Fig. 5.
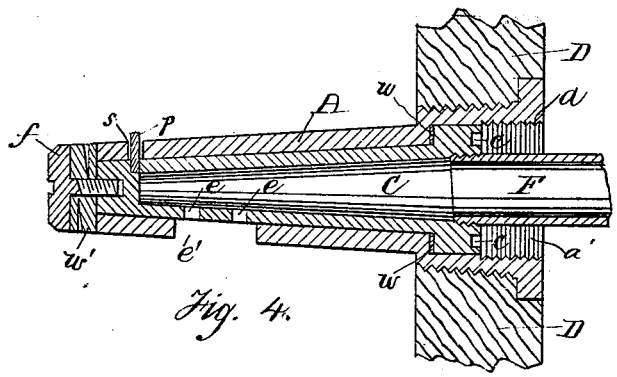 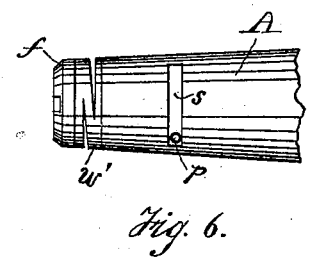
Fig. 4. Fig. 6.
Witnesses:
W. J. Hollis
L. E. Mills
Inventor:
D. C. Knight
by Knight Brown
Attys.

UNITED STATES PATENT OFFICE.

DAVID C. KNIGHT, OF MANCHESTER, MASSACHUSETTS.

FAUCET.

SPECIFICATION forming part of Letters Patent No. 235,091, dated December 7, 1880.

Application filed September 11, 1880. (No model.)

*To all whom it may concern:*

Be it known that I, DAVID C. KNIGHT, of Manchester, in the county of Essex and State of Massachusetts, have invented a certain new and useful Improvement in Faucets, of which the following is a specification.

This invention relates to that class of faucets composed of a socket secured to the head of a barrel so as to project into the interior of the barrel, and a rotary tube fitted in the socket and provided with an opening which registers with an opening in the socket, so as to permit the escape of the liquid in the barrel through the tube when the tube is turned in one direction, and is covered by the socket, so as to prevent the escape of the liquid when the tube is turned in the opposite direction, the tube being adapted to be connected to a suitable pipe or extension to conduct the liquid from the barrel.

The invention has for its object, first, to prevent the passage of liquid from the barrel into the tube from being obstructed by sediment or foreign matter; and, secondly, to enable the end of the socket to be readily and tightly closed, and the end of the tube to be protected when the faucet is not in use. To these ends my invention consists in the improvements which I will now proceed to describe and claim.

Of the accompanying drawings, forming a part of this specification, Figure 1 represents a side view of a faucet embodying my invention. Fig. 2 represents an end view of the same, the end being closed. Fig. 3 represents a section on line *x x*, Fig. 1. Fig. 4 represents a similar section, showing the end of the socket uncapped and a pipe connected with the tube. Fig. 5 represents a section on line *y y*, Fig. 3. Fig. 6 represents a plan view of a portion of the faucet.

The same letters of reference indicate the same parts in all the figures.

In the drawings, A represents a tubular metallic socket, tapered interiorly from end to end, and provided with an enlarged outer end or head, *a*, which is threaded externally, and thus adapted to be secured to the head D of a barrel, the socket projecting into the barrel. Within the head *a* is a screw-threaded recess, *a'*, to receive a threaded cap or plug, B.

C represents a tube, which is snugly fitted and adapted to turn in the bore of the socket A, and is connected to the socket by a screw, *f*, and an interposed spring-washer, *w'*. A portion of the tube C is provided with several small perforations, *e*, extending from its outer to its inner surface. This perforated portion constitutes a strainer which permits liquid to flow into the tube from the barrel when the tube is properly turned, and arrests on its outer surface the sediment and foreign matter contained in the liquid.

*e'* represents an opening in the socket A, which opening is of such size and is so located that when the tube is turned in one direction it will expose the strainer or perforated portion of the tube and permit liquids to flow through the perforations *e*, as shown in Figs. 1 and 4. When the tube is turned in the opposite direction the strainer will pass under and be covered by a portion of the socket adjacent to the opening *e'*, so that nothing can pass through the perforations *e*, as shown in Figs. 3 and 5.

It will be seen that when the tube is turned to cover the strainer one edge of the opening *e'* will act as a scraper to remove from the strainer any sediment or foreign matter that may have accumulated thereon, so that the ordinary operation of the faucet will usually serve to keep the strainer clear; and in case the strainer becomes obstructed while liquid is being drawn it may be cleared by turning the tube back and forth a few times.

It is well known that in beer and other malt liquors there is liable to be a considerable quantity of sediment and solid matter, which is likely to obstruct a strainer, and much difficulty from this cause has been experienced in the use of faucets with internal strainers, the strainers heretofore used being unprovided with means for clearing their surfaces; consequently the barrel has had to be frequently shaken to dislodge the obstructions. This difficulty is entirely obviated by my invention.

The rotary movements of the tube in the socket are properly limited by a pin, *p*, from the tube and a slot, *s*, in the socket in which the pin works. When the faucet is in operation a conducting-pipe, F, is secured into the outer end of the tube C, as shown in Fig. 4;

but when it is desired to permanently close the faucet and cover the end of the socket and tube the tube C is turned to cover the strainer, the pipe F is removed, and the plug or cap B is screwed into the recess $a'$, as shown in Figs. 2 and 3. The outer end of the tube C is located back of the recess $a'$, so that the cap B can be screwed in until its outer surface is flush with the outer end of the socket A. The faucet is thus securely closed and protected, so that the barrel can be safely transported or stored.

The plug B is provided with holes $d\ d$ for the reception of a turning-key, and the outer end of the tube C is provided with similar holes, $c\ c$.

By tapering the parts A C they may be more accurately fitted, are not apt to bind by pressure of the liquid, and are consequently more easily operated.

I do not claim, broadly, a faucet composed of a socket adapted to be inserted into a barrel and a tube fitted to turn therein, and provided with an opening to coincide with an opening in the socket, as I am aware that this is not new in a faucet having a strainer arranged outside of the socket.

I claim as my invention—

1. In a faucet, the tubular socket A, provided with the opening $e'$, and combined with the rotary tube C, fitted in said socket with a screw, $f$, and spring-washer $w'$, and having perforations $e$, forming a strainer, which is arranged to coincide with the opening $e'$ when the tube C is turned in one direction, and to be covered by the portion of the socket adjacent to the opening $e'$ when the tube is turned in the opposite direction, substantially as and for the purpose specified.

2. The combination of the socket A, tapered interiorly from end to end, adapted to be secured to a barrel, and provided with an enlarged head, $a$, having a threaded recess, $a'$, the rotary tube C, fitted in the socket A, and secured therein by a screw, $f$, and spring-washer $w'$, and terminating at the inner end of the recess $a'$, and the screw-plug B, adapted to be screwed into the recess $a'$ to cover the end of the tube C, as set forth.

DAVID CROFTS KNIGHT.

Witnesses:
HENRY KNIGHT,
GEO. F. ALLEN.